Oct. 30, 1928.

L. C. BAYLES 1,689,275

CLEANSING FLUID CONVEYING TUBE FOR ROCK DRILLS

Filed March 3, 1928

INVENTOR.
Lewis C. Bayles
BY
HIS. ATTORNEY

Patented Oct. 30, 1928.

1,689,275

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

CLEANSING-FLUID-CONVEYING TUBE FOR ROCK DRILLS.

Application filed March 3, 1928. Serial No. 258,888.

This invention relates to rock drills, but more particularly to rock drills of the hammer type which employ a tube or tubes for introducing cleansing fluid, such as water and air, through the drill steel into the drill hole to remove the cuttings therefrom.

One object of the invention is to prevent contact between the tube and the rearward end of an anvil block into which the tube extends and whereby the forward or free end of the tube is held against the effects of vibration incident to drilling.

Other objects will be in part obvious and in part pointed out hereinafter.

Figure 1:
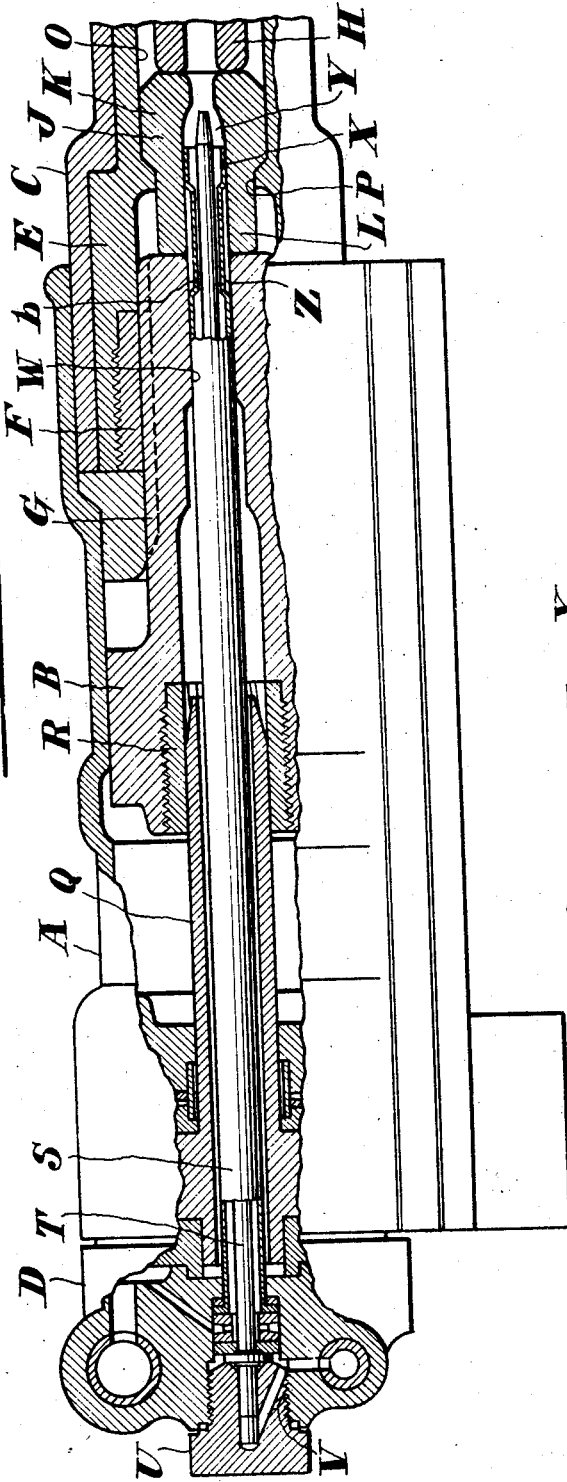
Figure 2:
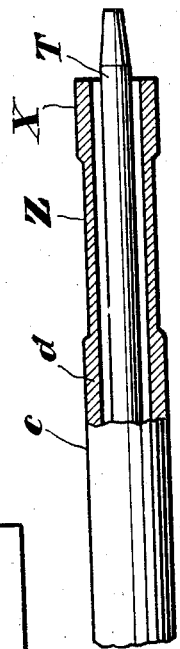

In the drawings accompanying the specification and in which similar reference characters refer to similar parts, Figure 1 is a longitudinal elevation partly in section of a rock drill equipped with a tube constructed in accordance with the practice of the invention, and Figure 2 is a longitudinal view partly in section of a modification of the invention.

Referring to the drawings, the invention is shown embodied in a rock drill having a cylinder A in which is disposed a reciprocatory piston B. A front head C projects into the front end of the cylinder A and on the rearward end of the cylinder is seated a back head D. The cylinder A, the front head C and the back head D comprise the casing of the drill and may be held in operative position with respect to each other in any suitable manner, as for instance, by the usual spring pressed side bolts (not shown).

Within the front head C is disposed a chuck E having a fluted chuck nut F interlocked slidably with a fluted extension G of the piston B. A working implement H, such as a drill steel, extends into the chuck E to receive the blows of the piston B, such blows being transmitted to the drill steel H by an anvil block J interposed between the piston and the drill steel. The anvil block J may be of a well known type having a head K and a stem L. The head K is guided by a bore O in the chuck E and the stem L projects through a reduced aperture P rearwardly of the bore O and into the path of the hammer piston B.

In the construction shown rotation of the drill steel H is effected by a rifle bar Q which interlocks slidably with a rifle nut R threaded into the rearward end of the piston B. The rifle bar may be of any well known type having suitable ratchet devices (not shown) for preventing rotation of the drill steel during one of the strokes of the piston, preferably during the forward stroke, and for inducing rotation of the drill steel during the rearward stroke of the piston.

As is customary in drills of the type illustrated, means such as a pair of concentrically arranged tubes S and T are extended through the rifle bar Q, the piston B and into the anvil block J for delivering cleansing media into the drill steel H to remove the cuttings from the drill hole. The inner tube T is the tube through which cleansing liquid, such as water, is conveyed through the drill, and the outer tube S is utilized for conveying pressure fluid to a point near the forward end of the water tube T to intermingle with the water issuing from the tube T and augment the pressure of the water. The tubes S and T may be secured at the rearward ends in any convenient manner as by a water plug U threaded into the recess V in the back head into which the ends of the tubes S and T extend.

As will be observed, the tubes S and T are secured only at the rearward ends. The forward ends of the tubes project into elements adapted to describe some form of movement, either rotative, reciprocatory, or both, so that it is considered impractical to secure the tubes at their forward extremities. When thus secured in the drill in the manner described the free ends of the tubes are constantly in a state of vibration during the operation of the drill. A certain stabilizing effect for these portions of the tubes may be obtained by permitting the tubes to come into slidable engagement with the elements through which they extend, particularly, the outer tube. For example, the tube S as illustrated is in slidable engagement with an aperture W in the front end of the piston extension G.

While the parts are new little difficulty will be experienced in holding the tubes against the effects of vibration. After a certain amount of usage, however, the reciprocatory elements, such as the piston B and the anvil block J become worn and during their reciprocations tend to move laterally. Such movement of the piston and anvil block is of course transmitted to the tubes and as wear increases it becomes sufficiently severe to cause breakage of the tubes. Although breakage of the tubes is not confined to any particular point on the tubes, such breakage of the outer tube, however, does occur more frequently in the vicinity of the point at which the hammer piston impacts against the anvil block J. The reason for this is that it is at this point that the rearward end of the anvil block J usually contacts with the surface of the tube S due to the tendency of the anvil block to tilt or move in a lateral direction at the rearward end after the surfaces of the anvil block and the element, such as the chuck E, whereby it is guided become worn.

The present invention contemplates the elimination of the wearing action by the anvil block J on the tube S. To this end the tube S is provided at its front end with an enlarged portion X which extends into a bore Y in the anvil block J and preferably to a point in the head K of the anvil block, as the head K is the portion of the anvil block which forms the guiding portion and is therefore less likely to be subjected to the tilting action referred to.

The enlarged portion X of the tube S may be of the same diameter as the body portion of the tube S or may be of any other suitable diameter, depending upon the conformation of the anvil block employed and the purpose for which the tube S may be used.

Rearwardly of the enlarged portion X is formed a neck Z which may be of such length that it will also extend into the bore W of the extension G when said extension rests on the anvil block J. The neck Z as illustrated in Figure 1 may be formed by rolling the tube to constrict it at this point sufficiently to prevent contact between the anvil block and the tube and at the same time to assure a passage b between the restricted portion and the periphery of the tube T for the passage of an adequate supply of pressure fluid through the tube S.

In the modification shown in Figure 2 a tube c having a heavy wall d is provided with a neck Z which may be formed by cutting an annular groove into the periphery of the tube. The neck Z is located near the front end of the tube, thus leaving an enlarged portion X at the front end of the tube c to cooperate slidably with the bore Y in the anvil block for stabilizing this end of the tube. In this modification the passage through the tube c is uniform throughout its length although a tube c of smaller diameter than that of the tube S in the preferred modification may be used to avoid a passage of excessive area between the tube c and the tube T.

I claim:

1. In a rock drill, the combination of a cylinder and a hammer piston, a front head for the cylinder, a hollow drill steel extending into the front head, an anvil block for transmitting the blows of the hammer piston to the drill steel, a tube extending through the piston and into the anvil block for conveying cleansing fluid into the drill steel, and a neck on the tube to prevent contact between the tube and the rearward end of the anvil block.

2. In a rock drill, the combination of a cylinder and a hammer piston, a front head for the cylinder, a hollow drill steel extending into the front head, an anvil block for transmitting the blows of the hammer piston to the drill steel, said anvil block having a bore, a tube extending through the piston and into the anvil block to convey cleansing fluid into the drill steel, an enlarged portion on the tube cooperating with the bore to prevent lateral movement of the front end of the tube, and a neck on the tube to prevent contact between the tube and the rearward end of the anvil block.

3. In a rock drill, the combination of a cylinder and a hammer piston, a front head for the cylinder, a hollow drill steel extending into the front head, an anvil block for transmitting the blows of the hammer piston to the drill steel, said anvil block having a bore, a tube extending through the piston and into the anvil block to convey cleansing fluid into the drill steel, an enlarged portion on the front end of the tube cooperating with the bore to stabilize the front end of the tube, and a neck on the tube adjacent the enlarged portion to prevent contact between the tube and the rearward end of the anvil block.

4. In a rock drill, the combination of a cylinder and a hammer piston, a front head for the cylinder, a hollow drill steel extending into the front head, an anvil block for transmitting the blows of the hammer piston to the drill steel, said anvil block having a bore, a tube extending through the piston and into the anvil block to convey cleansing fluid into the drill steel, and an enlarged portion on the front end of the tube contacting with the wall of the bore intermediate the ends of said bore for stabilizing the front end of the tube and for preventing contact between the body portion of the tube and the rearward end of the anvil block.

In testimony whereof I have signed this specification.

LEWIS C. BAYLES.